Sept. 20, 1932.   H. E. VAN DORN   1,878,031
AUTOMATIC CAR AND AIR COUPLER
Filed Jan. 6, 1928   5 Sheets-Sheet 1

Inventor:
Herbert E. Van Dorn,
By Wm. F. Freudenreich
Atty.

Sept. 20, 1932.  H. E. VAN DORN  1,878,031

AUTOMATIC CAR AND AIR COUPLER

Filed Jan. 6, 1928  5 Sheets-Sheet 2

Inventor:
Herbert E. Van Dorn,
By Wm. F. Freudenreich
Atty.

Inventor:
Herbert E. Van Dorn,
By Wm. F. Freudenreich
Atty.

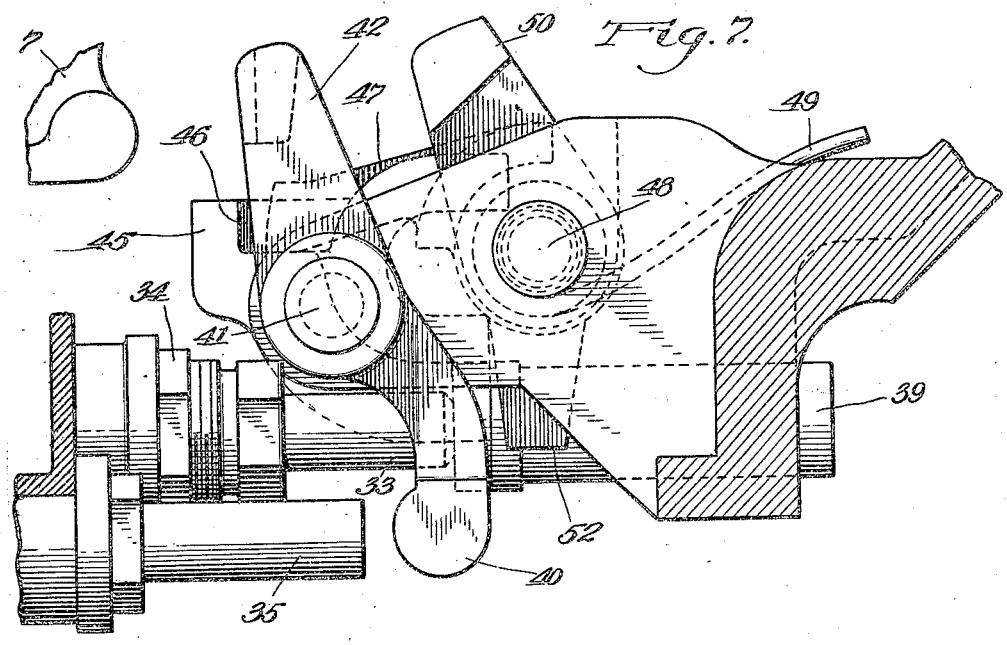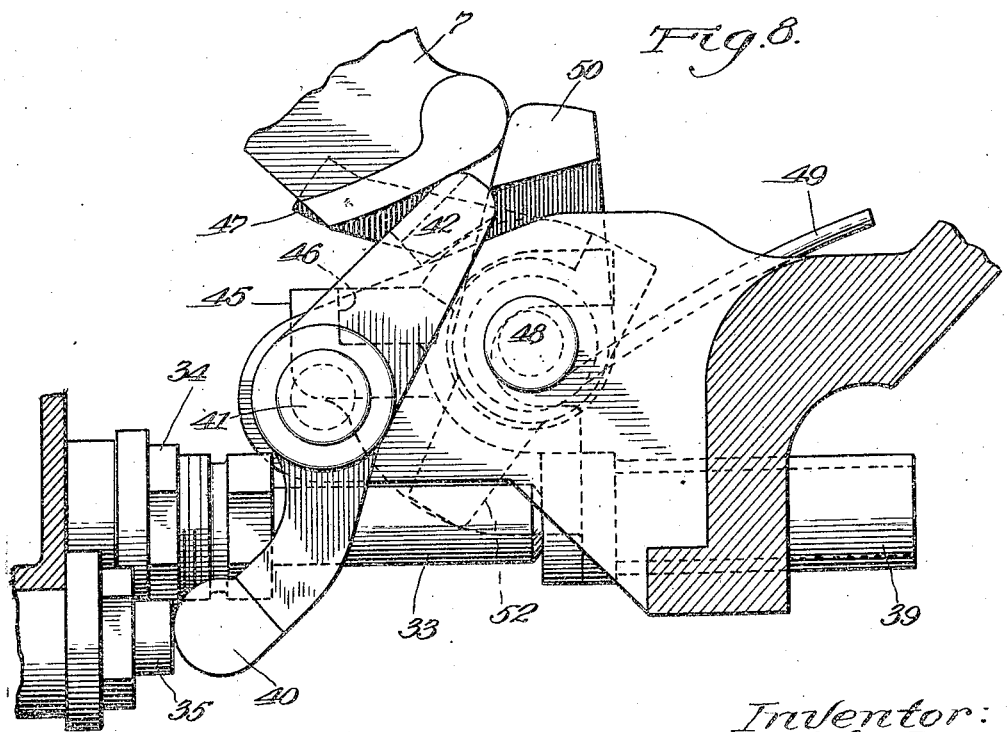

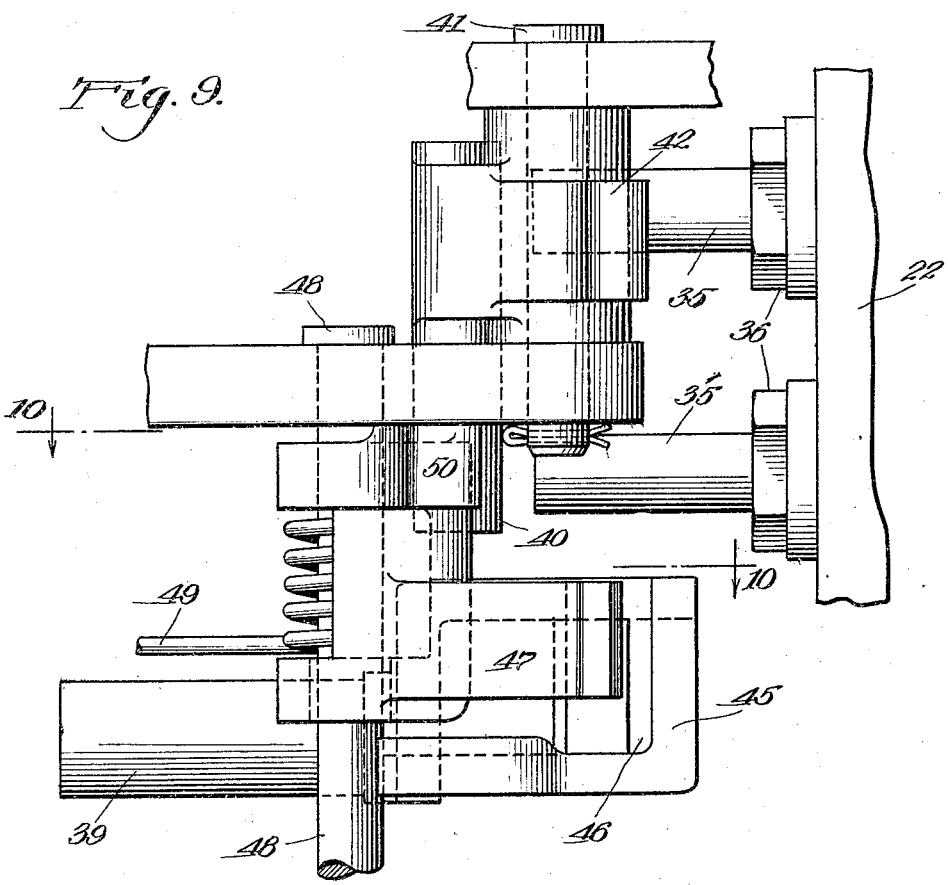
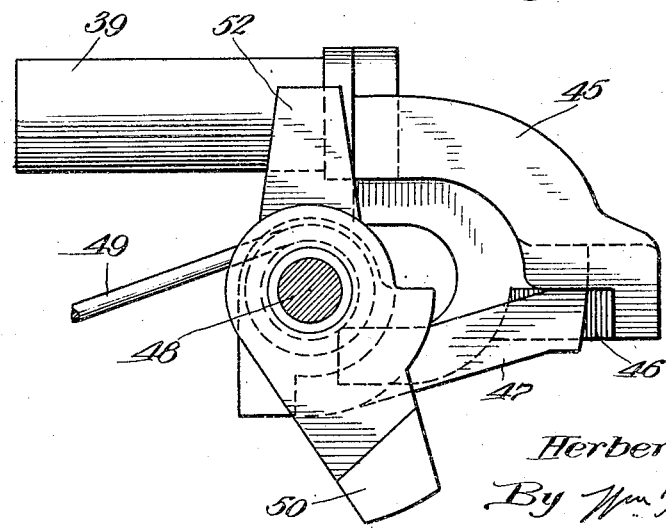

Patented Sept. 20, 1932

1,878,031

UNITED STATES PATENT OFFICE

HERBERT E. VAN DORN, OF CHICAGO, ILLINOIS, ASSIGNOR TO WILLIAM E. VAN DORN, OF PASADENA, CALIFORNIA

AUTOMATIC CAR AND AIR COUPLER

Application filed January 6, 1928. Serial No. 244,826.

The present invention has for its object to produce a simple, novel and efficient means for coupling together train pipes upon the coupling together of cars and automatically open and shut off said pipes upon coupling and uncoupling.

In carrying out my invention I employ pipes or conduits mounted on the car couplers for cooperation with corresponding elements on companion couplers, and arrange valves in these pipes or conduits to be automatically operated upon coupling and uncoupling. When a valve on one coupler is controlled through contact of an element with another, such element will move only with the actuating coupler and, if the separation of two couplers is slow, it may be that there will be objectionable or dangerous leakage of air before a pipe or pipes can be shut off completely. A further object of the present invention is to provide means for insuring against undesirable leakage of air under any conditions that may arise during the act of intentional coupling and uncoupling.

It may happen that the locks in the couplers will be accidentally displaced so as to permit cars to be accidentally uncoupled. Under such conditions the brakes should be automatically applied to stop the two separated cars or the two separated sections of a train. A further object of the present invention is to produce automatic couplings of the air and automatic control to prevent undesired discharge or leakage of air during coupling or uncoupling, while permitting air to escape upon accidental breaking apart of the train and thereby cause the brakes to be applied.

Figure 1:
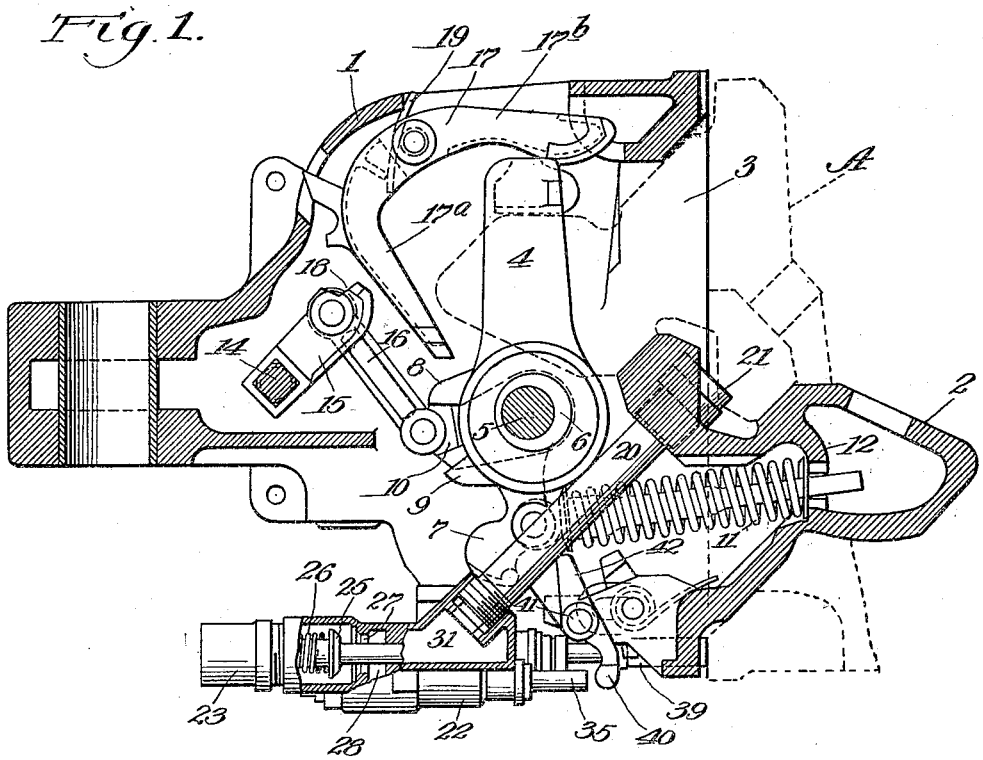
Figure 2:
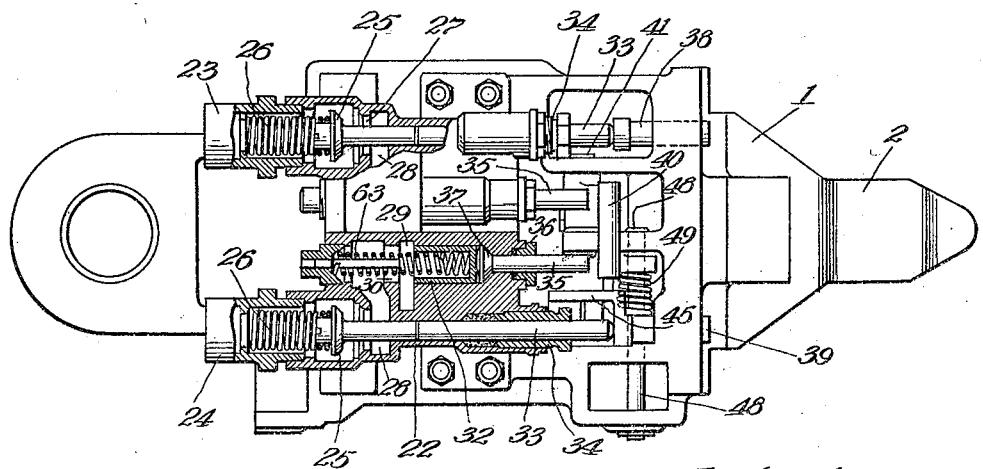
Figure 3:
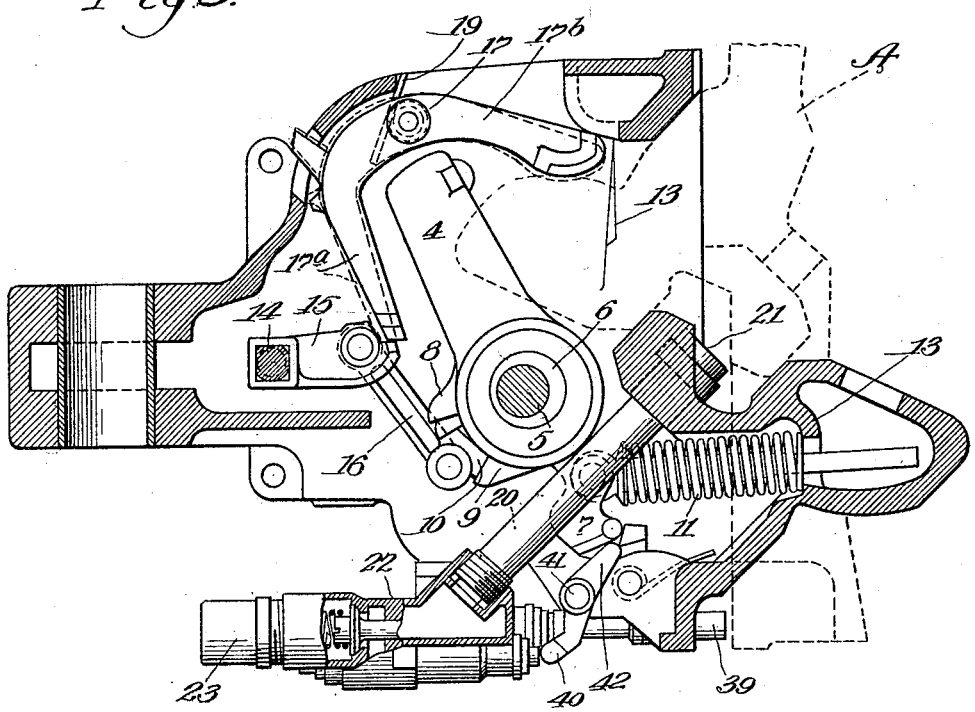
Figure 4:
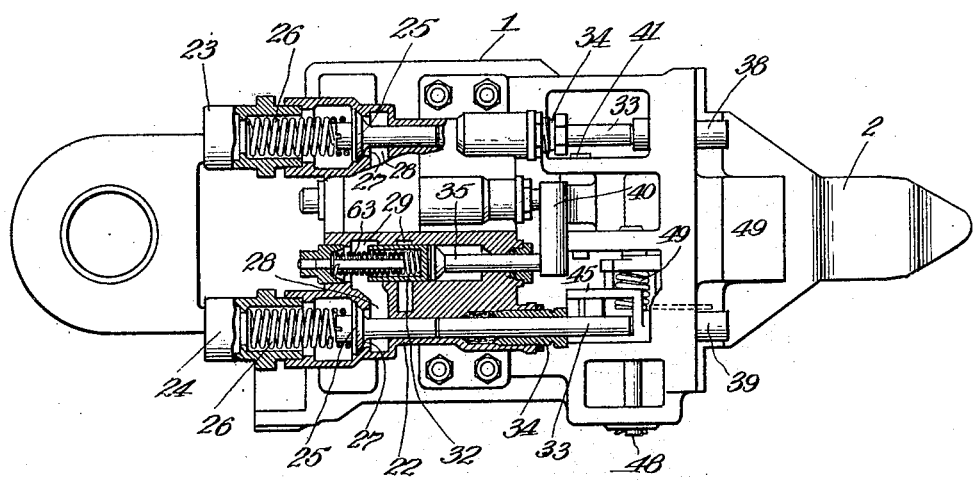
Figure 5:
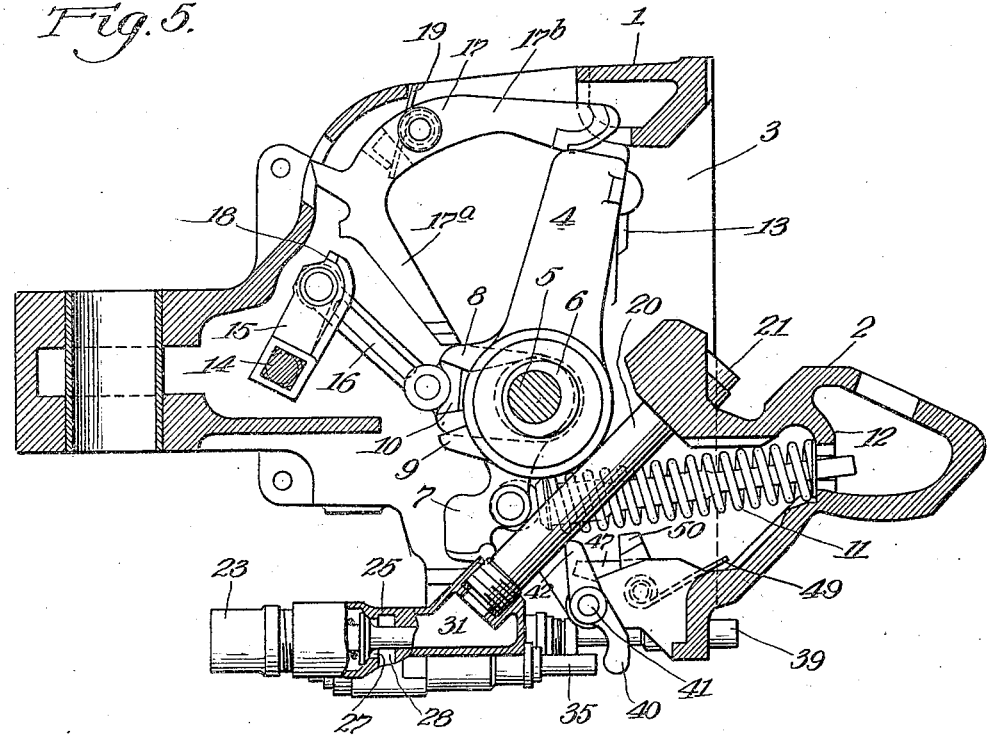
Figure 6:
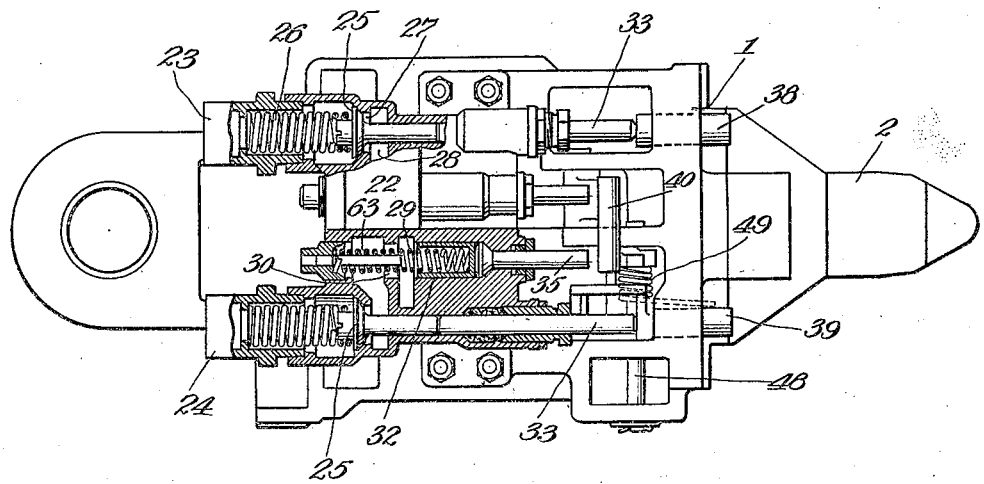

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a horizontal section through a car coupler equipped in accordance with the present invention; Fig. 2 is a side view of the coupler, portions being shown in section; Figs. 3 and 5 are views similar to Fig. 1, illustrating different positions of the parts; Figs. 4 and 6 are views similar to Fig. 2, showing those parts corresponding respectively to the positions indicated in Figs. 3 and 5; Figs. 7 and 8 are views of fragments of the coupler, on an enlarged scale, showing the parts in the same positions as they occupy in Figs. 1 and 3 respectively; Fig. 9 is a side elevation of the parts shown in Fig. 7, the view being in a direction looking down toward the top of Fig. 7; and Fig. 10 is a section taken approximately on line 10—10 of Fig. 9.

Referring to the drawings, 1 represents the head of an automatic car coupler, preferably of the tight-lock type. The specific coupler shown in the drawings is disclosed in my Patent Number 1,475,609 dated November 27, 1923, to which reference may be had for complete details. Briefly stated, the coupler head is a hollow member open at the front and having at one side a forwardly projecting nose 2 adapted to enter the chamber 3 in a companion coupler and be interlocked with the nose on the latter when a coupling is made. Within the chamber 3 of the head is a swinging bail 4 that embraces the nose of a companion coupler, when a coupling is made, and holds it in interlocked relation with the nose 2. The free ends of the arms of the bail are journalled on a vertical shaft 5 about which is an eccentric device 6. By turning the eccentric device, the bail may be moved a limited distance in the direction of its length to release it from the nose of the cooperating coupler or draw it against such nose. The eccentric device is fixed to or part of a tail member 7 projecting into the chamber of the head behind the nose. The bail has thereon two lugs 8 and 9 separated from each other angularly of the swinging axis of the bail. The combined eccentric and tail member has thereon a block 10 narrower than the distance between the lugs and lying between the lugs. Therefore the tail member may be swung a limited distance independently of the bail. A spring 11, arranged between the tail member and a transverse partition 12 in the hollow nose, tends constantly to swing the member 7 in a direction to move the bail forwardly or outwardly until it is arrested by a stop 13 projecting upwardly from the bottom wall of the coupler head, as best shown in Fig. 5. The backward swinging movements of the bail may be effected by any suitable means acting upon or through the member 7. In the drawings I have illustrated only the usual manual actuating means comprising a vertical rotatable shaft 14 in the rear end of the coupler head; this shaft having thereon a radial arm 15 connected to the block 10 by a link 16. In the chamber of the coupler head is a horizontal pivoted catch 17 more or less U-shaped, one arm, 17a, being adapted to drop into a notch 18 in the free end of the arm 15, as best shown in Fig. 3, to lock the bail in its released position; while the other arm, 17b, extends forwardly past the bail, for the purpose of permitting the catch to be tripped by the bail.

In Fig. 1 the parts are shown in the coupled position, a companion head A being indicated in dotted lines. It will be seen that the block 10 is pressing against the lug 8, so that the pressure of the spring 11 is being exerted in a direction to swing the bail forward in the clockwise direction, thus causing it to bind upon the nose of the coupler A. When it is desired to uncouple, the shaft 14 is turned. During the first portion of the turning movement of the operating shaft, the block 10 moves through the space between the lugs 8 and 9, turning the eccentric device and the tail member 7, and compressing the spring 11, without swinging the bail; but moving the bail bodily a short distance in the lengthwise direction so as to release its grip on the nose of the companion coupler. After the block 10 comes into contact with the lug 9, the bail swings with the block into the position shown in Fig. 3. There is a spring 19 acting on the catch device or trigger 17, so that the arm or finger 17a drops into the notch 18 on the actuating arm 15, when the bail swings clear of the arm or finger 17b, as shown in dotted lines in Fig. 3. Consequently the bail is locked in its unlocking or release position until the trigger is tripped. It will be seen that there is a lost motion between the actuating mechanism and the bail so that the block 10 and the tail 7, for example, swing through a greater angle than does the bail during the normal unlocking operation. If, when the parts are in the coupled positions as shown in Fig. 1, a force be applied directly to the bail 4 to swing it back, as would happen in the case of an accidental uncoupling, the block 10 would not move away from the lug 8, but would be driven by the latter, so that in this instance the block 10 and the tail 7 would swing through only the same angle as that through which the bail travels. I make use of this difference in the distance of travel of the elements of the unlocking mechanism, depending upon whether the latter is moved in the normal way for uncoupling or in an abnormal way as the result of an accidental uncoupling, in a manner to be hereinafter described.

Associated with the coupler head are any desired number of conduits for carrying fluids. In the arrangement shown, there are two such conduits, one comprising a part of the reservoir line and the other a part of the brake line of an air brake system. These conduits terminate in sections 20 fixed to the coupler head on lines extending diagonally of the longitudinal axis of the head and each having its outer end 21 fashioned to make a tight joint when brought in contact with a similar element on a companion or cooperating coupler. The part 21 may conveniently be a compressible rubber gasket such as is commonly used in similar situations.

Normally these conduits should be closed so that air cannot escape. When two cars are coupled together, it is desirable that the conduits be automatically opened to permit the air to flow freely from one car to another. Also, when the cars are uncoupled, the conduits should be automatically shut off. To accomplish this there may be valves placed in the conduits and provided with actuating means operated by an opposing coupler to cause the valves to open when a coupling is made and permit them to close upon uncoupling. However, this simple construction would permit some air to leak out during a coupling or an uncoupling operation and, if the process were slow, would cause the brakes to set. Furthermore, the conduits would be shut off in case of accidental uncoupling which would permit a train to break apart; whereas the brakes should be applied in the event of such an occurrence. I have therefore placed in each conduit two valves and means for controlling them in such a way that the desired conditions will be maintained under all circumstances.

The valve mechanism is placed in a suitable casing 22 to which the conduit sections 20 are connected. At the rear end of the casing are inlets 23 and 24 to which the reservoir and train pipes, respectively, are connected. Since the valve mechanisms for the two train lines are duplicates of each other, corresponding elements of each will be given the same reference characters. Air from either train line, after entering the proper inlet to the valve casing must pass a forwardly seating valve 25 behind which is a spring 26 tending constantly to close the same. This valve controls a port 27 communicating with a vertical passage 28. This passage leads to a chamber 29 having therein a partition dividing it into two compartments and provided with a port 30. The forward compartment of the chamber 29 opens into a chamber 31 into a wall of which the corresponding conduit section 20 is screwed. There is a long sleeve valve 32 slidably mounted in a part of the valve casing directly in front of and in registration with the port 30. A spring 63 acts on this sleeve valve in a direction tending constantly to push the same forward clear of the chamber 29. When the sleeve valve is pushed back against the resistance of its spring, it fits into the port 30 and therefore closes communication between the two compartments of the chamber 29, this being the closed position of this valve.

It will thus be seen that if either the valve 25 or the valve 32 is closed, no air can flow between the corresponding train pipe and conduit section 20.

The long axes of the valves 25 and 32 are parallel to the longitudinal axis of the coupler head. The valves 25 are opened by means of rods 33 arranged in front of and in alignment with the valve stems; the rods extending through suitable packed stuffing boxes 34 to prevent leakage of air past the same. The valves 32 are adapted to be closed by means of rods 35 extending forwardly through suitable stuffing boxes 36. Furthermore, the inner ends of the rods 35 may be in the form of outwardly seating valves 37 that engage in cooperating seats in the valve casing to form seals against leakage of air when the valves 32 are open. The upper of the rods 33 is adapted to be pushed back by a separate plunger 38 extending slidably through the front wall of the coupler head in alignment with the rod. The lower rod 33 is adapted to be actuated by a second separate plunger 39, mounted in the same way as the plunger 38. When two couplers are brought together, the plungers in each are pushed back by contact with the front face of the other, opening the valves 25; and when the couplers separate, the plungers move out under the urge of the springs behind the valves.

Since the conduit sections 20 are stationary the air connection or coupling is completed only when the car couplers are almost in their final interlocked positions, and is again interrupted as soon as the car couplers move apart slightly. However there must be a much greater relative movement between the car couplers to effect an opening or a closing of the valves 25. Therefore, in practice it is impossible to insure that the valves 25 will always be closed except when the air connection is complete, and it is for this reason that the valves 32 are provided.

The valves 32 are always open except at times when the valves 25 would permit air to escape contrary to intention or desire. To this end I have mounted in the coupler head an actuator consisting of a broad vertical wing 40 lying in front of the rods 35 and arranged to swing about a vertical pin 41. A finger 42 extends inwardly from the wing in the path of movement of the end of the part or tail 7 of the unlocking mechanism of the coupler. When the lock-actuating mechanism of the coupler is moved into its unlocking position, as shown in Fig. 3, the tail 7 strikes the finger 42, swinging the wing 40 against the outer ends of the rods 35 and closing the valves 32. Since the trigger 17 locks the lock-actuating mechanism in its unlocking position, the valves 32 will be locked in their closed positions until the lock-actuating mechanism is released. This release of the lock-actuating mechanism is effected automatically upon separation of the cars. When the coupler lock or bail is swung back, the nose of the companion coupler is left free to be withdrawn. However, in withdrawing, the nose engages the arm 17b of the trigger 17, tripping it and permitting the bail to swing forward again. In Fig. 3 the couplers are shown as having separated far enough to permit the valves 25 to close, but the trigger 17 has not yet been completely tripped. Therefore the valves 32 are held closed until after the valves 25 have closed, and only then is the trigger 17 tripped as shown in Fig. 5 to release the valves 32 and permit them to open. On the other hand, with the parts in uncoupled positions as shown in Fig. 5, the lock or bail is swung back by the entry of the nose of a companion coupler, in the act of coupling, causing the valves 32 to be held closed while the valves 25 are being opened.

When the locking bail is swung back by the nose of an opposing coupler in the act of coupling, the tail piece 7 of the bail-actuating means does not swing as far as it does when operated by the unlocking shaft. Therefore the tail piece 7 must be so shaped that after it has caused the wing 40 to swing far enough to close the valves 32, it will ride over the finger 42 without producing any further movement of the latter; thus permitting the valves 32 to be closed either by swinging the bail back in the act of coupling or in the act of unlocking.

As heretofore explained, the brake line should be opened to atmosphere in case of accidental uncoupling. I have therefore provided means to lock the valve 25 in the brake line open, after a coupling is made, until the couplers are intentionally unlocked. The plunger 39 has at the rear end an arm 45 that extends rearwardly and inwardly. A notch 46 is cut in the rear end of the arm so as to be open on the inner side and on the forward side. A horizontally swinging catch 47 is mounted at its front end on a vertical, stationary pin 48 located in front of the arm. There is a spring 49 between the catch and a stationary part of the coupler head, tending constantly to swing the catch toward the plunger. The parts are so proportioned that when the plunger 39 is pushed back to the position it occupies when two cars are coupled, the rear free end of the catch will engage in the notch and lock the plunger against forward movement,—thus locking the corresponding valve 25 open.

Therefore, whenever a coupling is made, the valves 25 in the brake lines of the two couplers will be locked open, so that air will escape from these lines and cause an application of the brakes unless the catches that hold the valves open are first released. Normally these catches must be released when the couplers are unlocked. To this end the catch is provided with a tripping finger 50 that lies in the path of the element 7 of the unlocking mechanism of the coupler. As best shown in Figs. 7 and 8, the element 7, as it swings back in the act of unlocking the coupler, first strikes the finger 42, swinging the wing 40 and closing the valves 32; and then it rides over the finger 42 and strikes the finger 50, causing the catch 47 to be swing out of the notch in the arm on the plunger 39. The parts are so proportioned that the catch 47 is tripped during the final portion of the movement of the element 7 equal to the amount of lost motion between the element 7 and the locking bail. Consequently the catch will be tripped when the unlocking mechanism for the coupler is actuated to unlock the coupler; but, if the bail is pushed back accidentally and therefore does not move the element 7 through as great an angle as is done in normal uncoupling, the catch will remain in holding position and the plunger cannot move out when the couplers separate, and the corresponding valve 25 will remain open and the brakes will be applied.

The catch 47 may have an additional finger 52, accessible from without through the side of the coupler, by means of which the catch may be tripped manually in case of need.

It will thus be seen that I have produced a simple and novel air coupling mechanism that will function automatically as cars are coupled and uncoupled to open and close the train lines as required; that regardless of the speed at which two car couplers come together or separate, the opening and closing of the train lines will always be performed quickly and without danger of leakage of air; that the couplers cannot come to rest, in approaching each other or receding from each other in any relative position that will permit the air lines to be wholly or partially opened; and that in the event of accidental separation of two couplers, by reason of an accidental movement of one of the coupler locks, the brake line will be opened to atmosphere and the brakes applied. Consequently the coupling and uncoupling of the air lines is effected automatically, without requiring any attention on the part of the trainmen, with the assurance that the lines will be opened and closed and kept opened and closed to meet the various exigencies of service and without danger that abnormal functioning under unusual conditions will release air or cause an application of the brakes when not desired or fail to produce an application of the brakes when there should be one.

While I have illustrated and described with particularity only a single preferred form of my invention, I do not desire to be limited to the exact structural details thus illustrated and described; but intend to cover all forms and arrangements which come within the definitions of my inventions constituting the appended claims.

I claim:—

1. The combination with a car coupler, of a conduit for fluids mounted on the coupler for cooperation with a conduit on a companion coupler, two valves in said conduit, means for automatically opening the first of said valves in the act of coupling, and means for automatically closing the second valve during the act of coupling before the first valve begins to open and again opening the second valve after the coupling has been completed.

2. The combination with a car coupler, of a conduit for fluids mounted on the coupler for cooperation with a conduit on a companion coupler, two valves in said conduit, means controlled by a companion coupler for opening the first of said valves upon coupling and closing it upon uncoupling, and means for closing the second valve prior to uncoupling and automatically opening it after the first valve has been closed and for automatically closing the second valve before the first valve begins to open in the act of coupling and then opening the second valve as the coupling is completed.

3. The combination with a car coupler having an element movable automatically from a first position to a second position and back again during the act of automatic coupling, of a conduit for fluids on the coupler to cooperate with a conduit on a companion coupler, a normally closed valve and a normally open valve in said conduit, means tending constantly to close the normally closed valve and to open the normally open valve, means actuated by a companion coupler to open the normally closed valve, and a device in the path of and actuated by the aforesaid element to close the normally open valve when said element moves toward said second position, the parts being so proportioned and arranged that in the act of coupling the normally open valve will be closed before the normally closed valve is opened.

4. The combination with a car coupler having a lock that moves toward a release position and then back again into a locking position during automatic coupling, of an element movable with the lock from a first position to a second position and back again during such act of coupling, a conduit on the coupler in position to cooperate with a corresponding conduit on a companion coupler, a valve in said conduit, a spring tending to hold said valve open, a second valve in the conduit, a spring tending to hold said second valve closed, an actuator for closing the first valve lying in the path of said element and adapted to be moved by said element in a direction to close the latter valve when said element is travelling toward its said second position, and an actuator for opening the second valve in position to be engaged by a companion coupler in the act of coupling after the first valve has been closed and cause the second valve to be opened.

5. The combination with a car coupler having a lock and an actuating means for the lock, of a conduit for fluids on the coupler for cooperation with a companion part on an opposing coupler, two valves in said conduit, means tending constantly to open the first valve, means tending constantly to close the second valve, means actuated by an opposing coupler for opening said second valve, and means associated with said lock-actuating means to close the first valve when said lock is shifted by said actuating means to its release position and normally to permit said first valve to open when said actuating means returns from its unlocking position.

6. The combination with a car coupler, of a conduit for fluids mounted on the coupler for cooperation with a companion part on an opposing coupler, two valves in said conduit, means tending constantly to open the first valve, means tending constantly to close the second valve, means actuated by an opposing coupler for opening said second valve when a coupling is made, and means for automatically effecting a temporary closing of the first valve during the act of coupling.

7. The combination with a car coupler, of a conduit for fluids mounted on the coupler and having a cushion end to engage with the end of a similar part on a companion coupler and be slightly compressed in the final movements of the couplers into coupled relation, two valves in said conduit, means tending constantly to open the first valve, means tending constantly to close the second valve, means for automatically opening the second valve in the act of coupling, and local means for closing said first valve, in the act of coupling, before the second valve begins to open and then permitting the first valve again to open after said cushion ends have come in contact with each other and have begun to be compressed.

8. The combination with a car coupler, having a lock and a lock-actuating means returnable from its unlocking position when two couplers separate after their lock-actuating means have been brought into normal unlocking positions, of a conduit for fluids on the coupler to cooperate with a conduit on a companion coupler, of two valves in the conduit, means adapted to be actuated by a companion coupler to open one of the valves upon coupling and leave the valve free to close upon separation of the couplers a distance greater than that required to cause the lock-actuating mechanism to be returned from its normal unlocking position, and means controlled by said lock-actuating mechanism to close the other valve when said lock-actuating mechanism is brought to its normal unlocking position and thereafter leave the latter valve free to open when the lock-actuating means is returned from the normal unlocking position upon separation of the couplers.

9. The combination with a car coupler having a lock and a lock-actuating means returnable from its normal unlocking position when two couplers separate after their lock-actuating means have been brought into their normal unlocking positions, of a conduit for fluids on the coupler to cooperate with a conduit on a companion coupler, of two valves in the conduit, means tending constantly to open the first valve, means tending constantly to close the second valve, means adapted to be actuated by a companion coupler to open the second valve upon coupling and leave the second valve free to close upon separation of the couplers a distance greater than that required to cause the lock actuating mechanism to be returned from its normal unlocking position, a catch for holding the second valve open, means associated with the lock-actuating means to trip the catch when the lock-actuating means is moved into its normal unlocking position, and means controlled by said lock-actuating means to close the first valve when said lock-actuating mechanism is brought to normal unlocking position and leave this valve free again to open when the lock-actuating means is returned from said unlocking position upon separation of the couplers.

In testimony whereof, I sign this specification.

HERBERT E. VAN DORN.